UNITED STATES PATENT OFFICE.

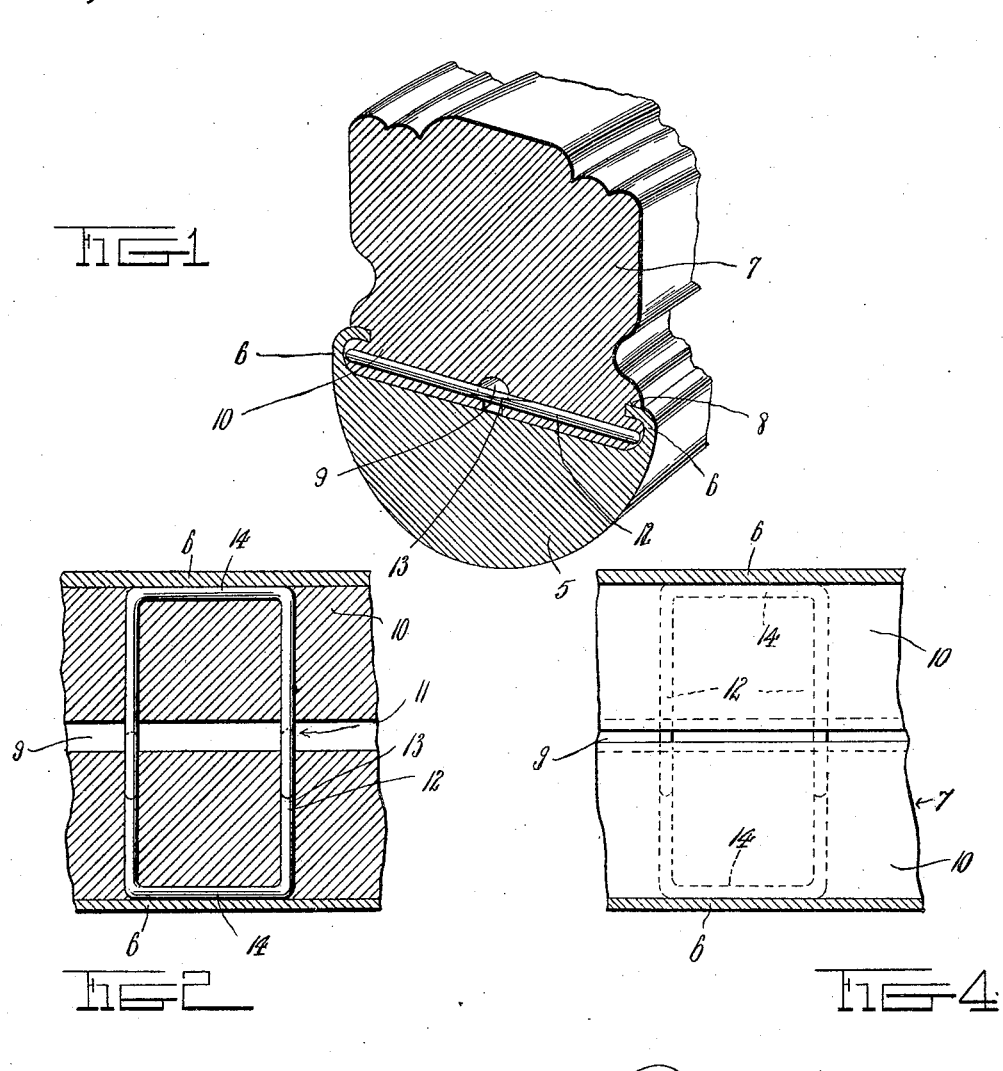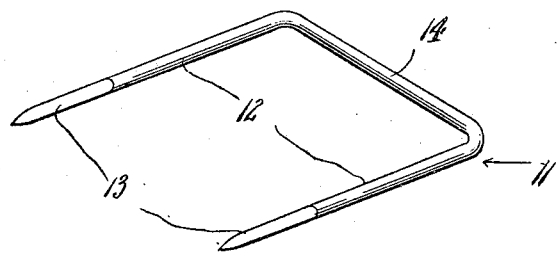

CLINTON H. KNECHT, OF AKRON, OHIO.

VEHICLE-TIRE.

935,033.  Specification of Letters Patent.  Patented Sept. 28, 1909.

Application filed August 26, 1908. Serial No. 450,359.

*To all whom it may concern:*

Be it known that I, CLINTON H. KNECHT, a citizen of the United States, residing at Akron, in the county of Summit, State of Ohio, have invented certain new and useful Improvements in Vehicle-Tires; and I do hereby declare the following to be a full, clear, and exact description of the invention, such as will enable others skilled in the art to which it appertains to make and use the same.

The invention relates to a vehicle tire and more particularly to the class of solid rubber tires having means such as staples embedded transversely in the base of the tire to secure and hold the same in a clencher rim.

The primary object of the invention is the provision of a vehicle tire preferably of solid rubber having embedded transversely in the body of the tire near its base throughout the length of the same and at intervals oppositely disposed staples to lock the tire in a clencher rim and prevent the same from accidentally becoming loose or detached from the rim but at the same time leaving the tire to be easily removed from the rim when occasion arises for such change.

Another object of the invention is the provision of a vehicle tire of the solid rubber type, however it may be of the pneumatic type and adapted especially for automobiles and other heavy vehicles. The tire has embedded near its base portion at intervals throughout the length of the same oppositely disposed U-shaped staples, the inner ends of which overlap one another and which staples are adapted to more securely lock the base edges of the tire to the clencher rim of a vehicle wheel and prevent the said tire from leaving the rim however, permitting it to be easily detached or removed from the rim when found desirable.

With these and other objects in view the invention for example consists in the construction, combination and arrangement of parts as will be hereinafter more fully described and as illustrated in the accompanying drawings which disclose the preferred form of embodiment of the invention. It is to be understood that changes, variations and modifications may be made such as come properly within the scope of the claims hereunto appended without departing from the spirit of the invention.

In the drawings: Figure 1 is a perspective view of a portion of a tire in position on a clencher rim the same being shown in cross section. Fig. 2 is a sectional plan view of a tire showing the opposed staples embedded therein. Fig. 3 is a detailed perspective view of one of the staples removed from the tire. Fig. 4 is a fragmentary bottom plan view of the tire the same being partly broken away.

Similar reference characters indicate corresponding parts throughout the several views in the drawings.

In the drawings, the numeral 5 designates a metal rim for a vehicle wheel having a channel in its outer face and with inturned clencher flanges 6. The tire is of a solid rubber body 7 and which has in its sides grooves 8 adapted to receive the inturned clencher flanges 6 of the metal rim.

Centrally in the base of the body 7 of the tire is a channel 9 to permit displacement of enlargements 10 on opposite sides of the said channel 9 to expand laterally beneath the clencher flanges 6 of the metal rim as firmly as may be necessary to positively lock the tire in position on the rim. Embedded in the base of the body 7 of the tire at intervals throughout the length of the same are opposite transversely disposed retainer members such as U-shaped staples 11 each of which has its spaced parallel legs 12 intersecting the central channel 9 in the base of the tire and the inner or free beveled extremities 13 of said legs are adapted to overlie and slidably engage correspondingly beveled extremities of the legs of the staple embedded in the base of the tire at the opposite side of the central channel therein.

The cross connecting piece 14 of each staple uniting the legs thereof protrudes a slight distance beyond the outside edge of the enlargement so as to reinforce the said enlargement and increase the rigidity thereof when underlying the clencher flange 6 which latter projects into the side groove 8 in the tire.

Due to the formation of the beveled extremities 13 of the legs 12 of the staples and by the same slidably contacting with each other cause an automatic spreading action upon the enlargements 10 to cause the expanding thereof for locking engagement with the flanges 6 when clenching the tires to the metal rim of the vehicle wheel. It is obvious that this spreading or expanding action of the enlargements 10 caused by the staples 11 will more securely lock the tire to the clencher rim and prevent accidental displacement of the said tire on the rim or leaving its seat in the latter, however the said tire can be readily and quickly removed from the rim when desired.

What is claimed is—

1. In a vehicle tire, the combination with a clencher rim, of a tire, and opposed retaining devices independent of each other embedded in the base of the tire and having bevel faced overlapping extremities acting upon each other to hold the tire in positive locking engagement with the rim.

2. In a vehicle tire, the combination with a clencher rim, of a tire, and independent retaining means embedded and oppositely disposed transversely in the base of the tire and having overlapped beveled extremities acting upon each other to automatically expand the base of the tire, for positive locking engagement with the rim.

In testimony whereof, I affix my signature, in presence of two witnesses.

CLINTON H. KNECHT.

Witnesses:
    THEO. A. HOCKWALT,
    G. W. GRIDLEY.